United States Patent
Liu et al.

(10) Patent No.: US 9,195,543 B2
(45) Date of Patent: Nov. 24, 2015

(54) METHOD AND DEVICE FOR DETECTING DATA RELIABILITY

(71) Applicant: Huawei Technologies Co., Ltd., Shenzhen, Guangdong (CN)

(72) Inventors: Yiyang Liu, Hangzhou (CN); Wei Wang, Hangzhou (CN); Haizhen Zheng, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 368 days.

(21) Appl. No.: 13/732,017

(22) Filed: Dec. 31, 2012

(65) Prior Publication Data
US 2013/0124914 A1    May 16, 2013

Related U.S. Application Data

(63) Continuation of application No. PCT/CN2011/078796, filed on Aug. 23, 2011.

(51) Int. Cl.
*G06F 11/00* (2006.01)
*G06F 11/14* (2006.01)
(Continued)

(52) U.S. Cl.
CPC ........ *G06F 11/1412* (2013.01); *G06F 11/1004* (2013.01); *G06F 11/1666* (2013.01)

(58) Field of Classification Search
CPC ............ G06F 11/1004; G06F 11/1412; G06F 11/1666; G11B 20/1803; G11B 20/1833; G11B 2020/1843; G11C 29/76
See application file for complete search history.

(56) References Cited

U.S. PATENT DOCUMENTS

| 5,457,791 A | 10/1995 | Matsumoto et al. |
| 5,995,983 A | 11/1999 | Mano |

(Continued)

FOREIGN PATENT DOCUMENTS

| CN | 101030168 A | 9/2007 |
| CN | 101263456 A | 9/2008 |

(Continued)

OTHER PUBLICATIONS

Thread (computer science), Wikipedia, Mar. 31, 2011 version retrieved via Wayback Machine.*

(Continued)

*Primary Examiner* — Marc Duncan
(74) *Attorney, Agent, or Firm* — Conley Rose, P.C.; Grant Rodolph; Nicholas K. Beaulieu

(57) ABSTRACT

Embodiments of the present invention disclose a method and a device for detecting data reliability, which belong to the field of computer technologies. The method includes: dividing source data into multiple source data blocks; establishing a corresponding duplicate data block for each source data block, where the duplicate data block and the source data block are stored in different physical memory blocks respectively; establishing a corresponding reliability maintenance data structure for the source data block; and registering the reliability maintenance data structure with a first reliability maintenance thread of a central processing unit, the source data block corresponding to the reliability maintenance data structure registered with the first reliability maintenance thread, comparing a reliability check value of the source data block with a reliability check value recorded in the reliability maintenance data structure, and replacing the source data block having the error with the duplicate data block.

10 Claims, 4 Drawing Sheets

(51) Int. Cl.
*G06F 11/10* (2006.01)
*G06F 11/16* (2006.01)

(56) References Cited

U.S. PATENT DOCUMENTS

| | | | |
|---|---|---|---|
| 7,694,191 B1* | 4/2010 | Bono et al. | 714/48 |
| 8,751,859 B2* | 6/2014 | Becker-Szendy et al. | 714/6.1 |
| 9,098,411 B1* | 8/2015 | Varnica | G11B 20/1833 1/1 |
| 2004/0133838 A1* | 7/2004 | Ito | 714/766 |
| 2004/0268178 A1* | 12/2004 | Fredin | 714/6 |
| 2006/0069941 A1 | 3/2006 | Trantham et al. | |
| 2006/0294299 A1* | 12/2006 | Edirisooriya | 711/112 |
| 2007/0043975 A1 | 2/2007 | Varadarajan et al. | |
| 2007/0061556 A1 | 3/2007 | Rothman et al. | |
| 2009/0199039 A1 | 8/2009 | Zhang et al. | |
| 2010/0131832 A1* | 5/2010 | Cooper | G06F 11/1004 714/807 |
| 2010/0205508 A1* | 8/2010 | Mesonzhnik et al. | 714/763 |
| 2011/0154104 A1 | 6/2011 | Swanson et al. | |
| 2012/0096310 A1* | 4/2012 | Varanasi et al. | 714/15 |
| 2012/0203980 A1* | 8/2012 | Flynn et al. | 711/154 |
| 2013/0067270 A1* | 3/2013 | Lee et al. | 714/6.1 |
| 2014/0181575 A1* | 6/2014 | Kalach et al. | 714/6.11 |

FOREIGN PATENT DOCUMENTS

| | | | |
|---|---|---|---|
| CN | 101501653 A | 8/2009 | |
| CN | 101650680 A | 2/2010 | |
| CN | 101901174 A | 12/2010 | |
| JP | 05181755 A | 7/1993 | |
| JP | 0962586 A | 3/1997 | |
| JP | 2008523503 A | 7/2008 | |
| JP | 2011134327 A | 7/2011 | |
| WO | 2006062959 A2 | 6/2006 | |
| WO | 2007091237 A2 | 8/2007 | |
| WO | 2010035316 A1 | 4/2010 | |

OTHER PUBLICATIONS

Foreign Communication From a Counterpart Application, European Application No. 11860298.6, Extended European Search Report dated Jun. 23, 2014, 7 pages.

Communication from a foreign counterpart application, International Application No. PCT/CN2011/078796, International Search Report dated May 31, 2012, 3 pages.

Communication from a foreign counterpart application, International Application No. PCT/CN2011/078796, Partial English Translation, International Search Report dated May 31, 2012, 2 pages.

Partial English Translation and Abstract of Japanese Patent Application No. JP2008523503A, Part 1, May 19, 2015, 4 pages.

Partial English Translation and Abstract of Japanese Patent Application No. JP2008523503A, Part 2, May 19, 2015, 7 pages.

Partial English Translation and Abstract of Japanese Patent Application No. JP2011134327A, Part 1, May 19, 2015, 5 pages.

Partial English Translation and Abstract of Japanese Patent Application No. JP2011134327A, Part 2, May 19, 2015, 10 pages.

Partial English Translation and Abstract of Japanese Patent Application No. JPH05181755, Part 1, May 19, 2015, 2 pages.

Partial English Translation and Abstract of Japanese Patent Application No. JPH05181755, Part 2, May 19, 2015, 3 pages.

Partial English Translation and Abstract of Japanese Patent Application No. JPH09062586A, Part 1, May 19, 2015, 4 pages.

Partial English Translation and Abstract of Japanese Patent Application No. JPH09062586A, Part 2, May 19, 2015, 11 pages.

Foreign Communication From a Counterpart Application, Japanese Application No. 2014-526354, Japanese Office Action dated Mar. 23, 2015, 4 pages.

Foreign Communication From a Counterpart Application, Japanese Application No. 2014-526354, English Translation of Japanese Office Action dated Mar. 23, 2015, 4 pages.

* cited by examiner

METHOD AND DEVICE FOR DETECTING DATA RELIABILITY

CROSS-REFERENCE TO RELATED APPLICATION

This application is a continuation of International Application No. PCT/CN2011/078796, filed on Aug. 23, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of computer technologies, and in particular, to a method and a device for detecting data reliability.

BACKGROUND

With more and more applications of computer key services, the requirement of computer system reliability is increasingly higher. Especially in the field with a high requirement on data reliability such as the economy and finance, once an error occurs in a processing program or stored information, inestimable loss may be caused. Therefore, it is important to improve the reliability of the program and the stored information.

Two solutions for detecting data reliability exist in the prior art. The first manner is storing two duplicates of a process code segment in a physical memory, dividing the process code segment into memory areas with a fixed size, and based on a dividing result, starting a corresponding number of kernel threads as a consistency maintenance thread to maintain the consistency between a process code segment area and a duplicate. If it is found that a program code segment is erroneous, recovering is performed. The second manner is setting a breakpoint for the data in advance, and when it is found that the data is erroneous, rolling back to the preset breakpoint or reloading the data, and restarting the program.

In the implementation of the present invention, the inventors find that the prior art at least has the following problems:

When the first manner is used, the possibility that an error occurs again to a data block having an error is large, so the reliability needs to be continuously compared twice on the basis of byte to determine whether the data is reliable, and the number of kernel threads maintaining the reliability is the same as the number of the data blocks, so too many kernel threads exist, thereby increasing the overhead of the system, and being inconvenient for system management. When the second manner is used, program reset wastes the system time, increases the overhead of the system, and in some application scenarios, the program reset is forbidden to happen because it results in great influence on the service.

SUMMARY

To improve the efficiency of detecting data and recovering data, embodiments of the present invention provide a method and a device for detecting data reliability. The technical solutions are as follows:

An embodiment of the present invention provides a method for detecting data reliability, which includes: dividing source data into multiple source data blocks; establishing a corresponding duplicate data block for each source data block, where the duplicate data block and the source data block are stored in different physical memory blocks respectively; according to each source data block, establishing a corresponding reliability maintenance data structure for the source data block; and registering the reliability maintenance data structure with a first reliability maintenance thread of a central processing unit so that the first reliability maintenance thread detects the source data block corresponding to the reliability maintenance data structure registered with the first reliability maintenance thread to obtain a reliability check value of the source data block, comparing the reliability check value with a reliability check value recorded by the source data block in the reliability maintenance data structure corresponding to the source data block, where if different, it indicates that an error occurs in the source data block, and replacing the source data block having the error with the duplicate data block corresponding to the source data block having the error.

An embodiment of the present invention provides a device for detecting data reliability, which includes: a dividing module configured to divide source data into multiple source data blocks; a first establishing module configured to establish a corresponding duplicate data block for each source data block, where the duplicate data block and the source data block are stored in different physical memory blocks respectively; a second establishing module configured to, according to each source data block, establish a corresponding reliability maintenance data structure for the source data block; and a detecting module configured to register the reliability maintenance data structure with a first reliability maintenance thread of a central processing unit so that the first reliability maintenance thread detects the source data block corresponding to the reliability maintenance data structure registered with the first reliability maintenance thread to obtain a reliability check value of the source data block, compare the reliability check value with a reliability check value recorded by the source data block in the reliability maintenance data structure corresponding to the source data block, where if different, it indicates that an error occurs in the source data block, and replace the source data block having the error with the duplicate data block corresponding to the source data block having the error.

The technical solutions provided in the embodiments of the present invention bring the following beneficial effects: the corresponding duplicate data block and the corresponding reliability maintenance data structure are established for the source data block, a few threads at the central processing unit are used, the reliability check value of the source data block is compared with the reliability check value recorded by the source data block in the reliability maintenance data structure corresponding to the source data block, so as to determine whether the error occurs, and the duplicate data is used for replacement after the error occurs, thereby implementing fast detection on the data reliability and the objective of recovering erroneous data, and reducing the system overhead.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are some

DETAILED DESCRIPTION

In order to make the objectives, technical solutions and advantages of the present invention clearer, the embodiments of the present invention are described in detail in the following with reference to the accompanying drawings.

Embodiment 1

Figure 1:
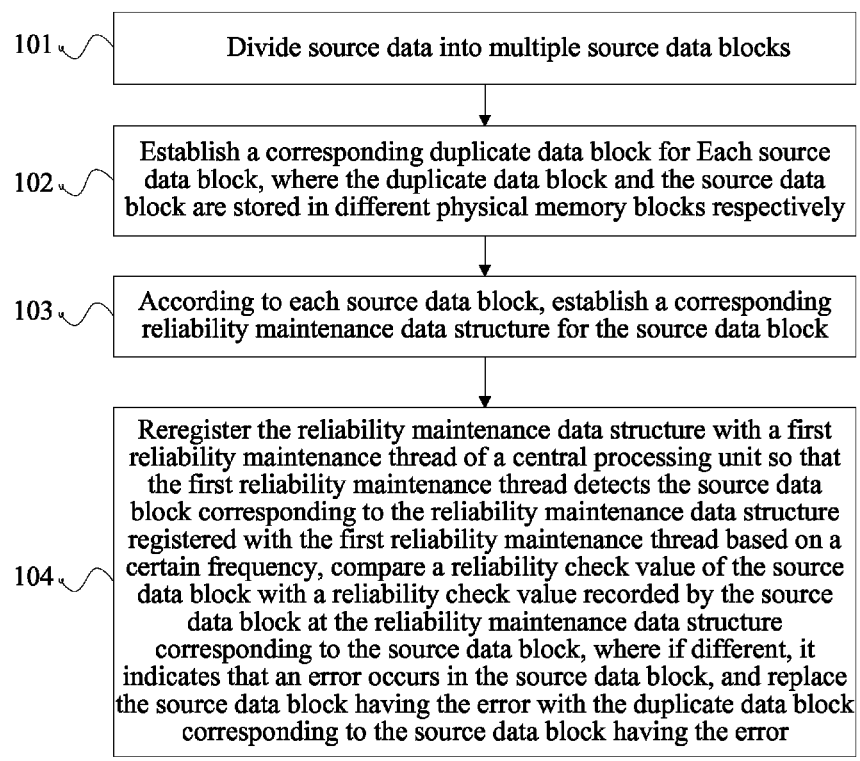
FIG. 1 is a schematic flow chart of a method for detecting data reliability provided in Embodiment 1 of the present invention.

Embodiment 1 of the present invention provides a method for detecting data reliability, and a flow chart of it is shown in FIG. 1, which includes:

Step 101: Divide source data into multiple source data blocks;

Step 102: Establish a corresponding duplicate data block for each source data block, where the duplicate data block and the source data block are stored in different physical memory blocks respectively;

Step 103: According to each source data block, establish a corresponding reliability maintenance data structure for the source data block; and Step 104: Register the reliability maintenance data structure with a first reliability maintenance thread of a central processing unit so that the first reliability maintenance thread detects the source data block corresponding to the reliability maintenance data structure registered with the first reliability maintenance thread to obtain a reliability check value of the source data block, compare the reliability check value with a reliability check value recorded by the source data block in the reliability maintenance data structure corresponding to the source data block, where if different, it indicates that an error occurs in the source data block, and replace the source data block having the error with the duplicate data block corresponding to the source data block having the error.

In the embodiment of the present invention, the corresponding duplicate data block and the corresponding reliability maintenance data structure are established for the source data block, a few threads at the central processing unit are used, and the reliability check value of the source data block is compared with the reliability check value recorded by the source data block in the reliability maintenance data structure corresponding to the source data block, so as to determine whether an error occurs, and the duplicate data is used for replacement after the error occurs, thereby implementing fast detection on the data reliability and the objective of recovering erroneous data, and reducing the system overhead.

Embodiment 2

Figure 2A:
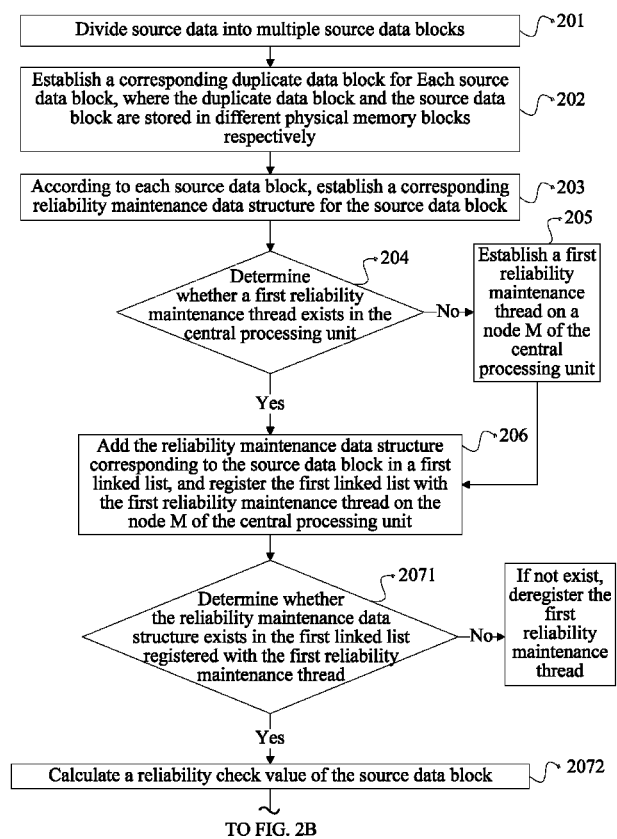
FIG. 2A and FIG. 2B are a schematic flow chart of a method for detecting data reliability provided in Embodiment 2 of the present invention.
Figure 2B:
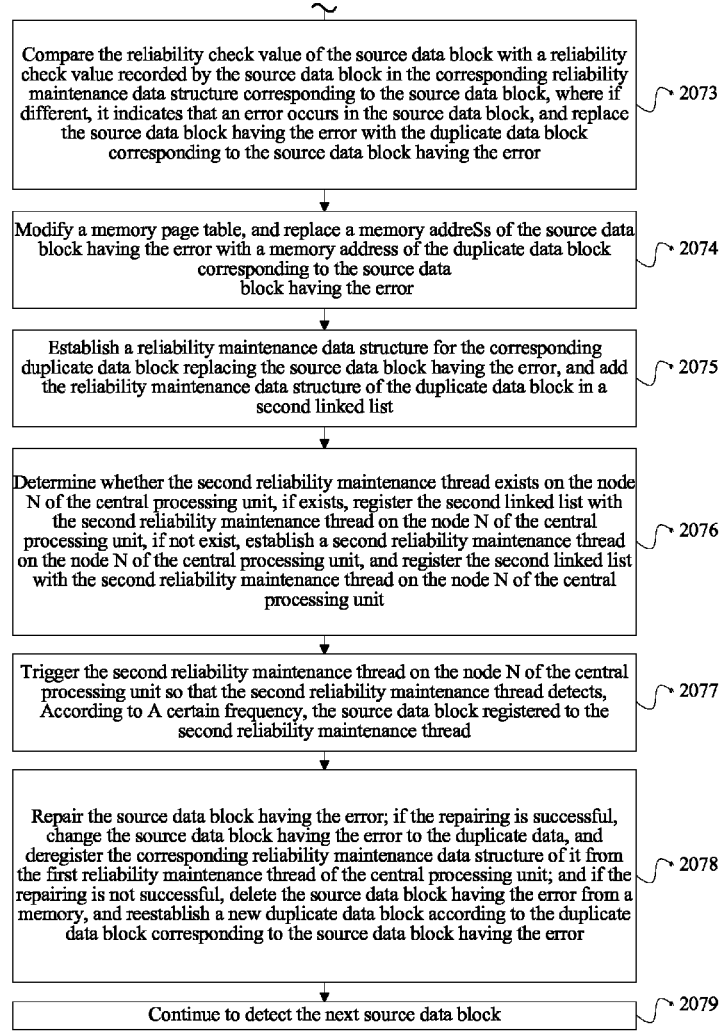

Embodiment 2 of the present invention provides a method for detecting data reliability, and a flow chart of it is shown in FIG. 2A and FIG. 2B, which includes:

Step 201: Divide source data into multiple source data blocks;

The source data requiring reliability detecting is divided into the source data blocks with the same size. The source data is not averagely divided based on the size, but is divided according to an integral multiple of a page frame, so the size of the last divided source data block may be different from the size of other source data blocks. A page frame is a concept in memory management, and a circuit, which is able to automatically convert a virtual memory address (e.g., a logical address) into a physical memory address, is added in a central processing unit (CPU), and in order to simplify this circuit, a random access memory (RAM) is divided into blocks with the length of 4 kilobytes (KB) or 8 KB, and this block is called the page frame.

In the embodiment of the present invention, the source data requiring reliability detecting may be data of great importance to the system, such as a kernel code, a program code, and key data in running Step 202: Establish a corresponding duplicate data block for each source data block, where the duplicate data block and the source data block are stored in different physical memory blocks respectively.

The corresponding duplicate data block is established for each source data block, which is backup data used for replacement after an error occurs in the source data block. The duplicate data block and the source data block are separately stored and are located in different physical memory blocks respectively. For example, the source data block is stored in a block of a non-uniform memory access architecture (NUMA) memory, and the duplicate data block is stored in a block of the NUMA memory different from that of the source data block.

Step 203: According to each source data block, establish a corresponding reliability maintenance data structure for the source data block.

Specifically, each generated reliability maintenance data structure corresponds to the corresponding source data block of it one by one. The reliability maintenance data structure at least includes the following data: reliability detecting information such as the data size of the source data block, a start address of the source data block in the memory, a start address of the duplicate data block in the memory, a reliability check value, error information, and detecting time. The reliability check value is used to determine correctness of the source data block, and many available check algorithms exist. For example, the reliability check value may be obtained through a message digest algorithm 5 (MD5) algorithm, a cyclic redundancy check (CRC32) algorithm, or a secure hash algorithm (SHA1), and the embodiment of the present invention is not limited to this.

Step 204: Determine whether a first reliability maintenance thread exists in the central processing unit.

If it exists, execute step 206; if it does not exist, execute step 205, where a first reliability maintenance thread is established in a node M of the central processing unit.

The first reliability maintenance thread of the node M of the central processing unit only detects the memory block corresponding to the first reliability maintenance thread, and a second reliability maintenance thread of a node N of the central processing unit only detects the memory block corresponding to second reliability maintenance thread, and the two memory blocks are not the same memory block. Therefore, it is assumed that the memory block storing the source data block is the memory block corresponding to the first reliability maintenance thread of the node M of the central processing unit; the memory block storing the duplicate data block is the memory block corresponding to the second reliability maintenance thread of the node N of the central processing unit.

Step 205: Establish the first reliability maintenance thread at the node M of the central processing unit.

Step 206: Add the reliability maintenance data structure corresponding to the source data block in a first linked list, and register the first linked list with the first reliability maintenance thread of the node M of the central processing unit.

All reliability maintenance data structures corresponding to the source data blocks in the memory block corresponding to the first reliability maintenance thread of the node M of the central processing unit are added in the first linked list, and the first reliability maintenance thread of the node M of the central processing unit may find the source data block according to the start address in the memory of the source data block in the reliability maintenance data structure of the first linked list, and detects the source data block.

Step 207: The first reliability maintenance thread on the node M of the central processing unit detects, according to a certain frequency, the source data block corresponding to the reliability maintenance data structure registered to the first reliability maintenance thread.

The specific detecting process includes:

Step 2071: Determine whether the reliability maintenance data structure exists in the first linked list registered with the first reliability maintenance thread, and if it does not exist, deregister the first reliability maintenance thread.

Each reliability maintenance data structure corresponds to one source data block, and therefore, if the reliability maintenance data structure exists, it indicates that the source data block requiring detection still exists. If the reliability maintenance data structure exists, step 2072 is executed; and if the reliability maintenance data structure does not exist, the first reliability maintenance thread on the current node M of the central processing unit is deregistered.

Step 2072: Calculate a reliability check value of the source data block.

Check calculation is performed on the source data block through the same check algorithm, which is used to calculate the reliability check value when the reliability maintenance data structure is being built, so as to generate a reliability check code.

Step 2073: Compare the reliability check value of the source data block with a reliability check value recorded by the source data block in the reliability maintenance data structure corresponding to the source data block, where if different, it indicates that an error occurs in the source data block, and replace the source data block having the error with the duplicate data block corresponding to the source data block having the error.

Compare the reliability check value of the source data block obtained after calculation with the reliability check value, which is recorded by the source data block when the reliability maintenance data structure is being built. If the two reliability check values are the same, it indicates that no error occurs in the source data block, and step 2079 is performed so that the first reliability maintenance thread continues to detect a next source data block; if the two reliability check values are different, it indicates that an error occurs in the source data block, and step 2074 is performed to replace the source data block having the error.

Step 2074: Modify a memory page table, and replace a memory address of the source data block having the error with a memory address of the duplicate data block corresponding to the source data block having the error.

The memory page table is modified, and the memory address of the source data block having the error is replaced with the memory address of the duplicate data block corresponding to the source data block having the error, that is, the source data block is replaced with the duplicate data block corresponding to the source data block having the error, and then the duplicate data block and other source data blocks are stored in the same memory block.

Step 2075: Establish a reliability maintenance data structure for the corresponding duplicate data block replacing the source data block having the error, and add the reliability maintenance data structure of the duplicate data block in a second linked list.

At this time, the source data block having the error is replaced with the duplicate data block corresponding to the source data block having the error, that is, the duplicate data block is changed to the source data block, but no reliability maintenance data structure corresponds to the duplicate data block, and therefore, the data structure corresponding to the duplicate data block is established for the duplicate data block changed to the source data block. The content of the established reliability maintenance data structure is the same as the content of the reliability maintenance data structure in step 203, and the error occurring this time is recorded in a field of the error information in a newly established reliability maintenance data structure, and the time when the error occurs is recorded in the field of detecting time.

Step 2076: Determine whether the second reliability maintenance thread exists on the node N of the central processing unit, if it exists, register the second linked list with the second reliability maintenance thread of the node N of the central processing unit, if it does not exist, establish a second reliability maintenance thread on the node N of the central processing unit, and register the second linked list with the second reliability maintenance thread on the node N of the central processing unit.

After the reliability maintenance data structure is established for the corresponding duplicate data block replacing the source data block having the error, it is determined at the node N of the central processing unit that whether a reliability maintenance process exists, and if it exists, the second linked list is registered with the second reliability maintenance thread of the node N of the central processing unit; if it does not exist, a second reliability maintenance thread is established on the node N of the central processing unit, and the second linked list is registered with the second reliability maintenance thread on the node N of the central processing unit.

After the data is replaced, a reliability maintenance data structure is established for each duplicate data block used to replace the source data block, all the newly established reliability maintenance data structures may be registered with the second reliability maintenance thread on the node N of the central processing unit, and the second reliability maintenance thread on the node N of the central processing unit is used to detect the reliability of these duplicate data blocks replacing the source data blocks having errors.

Step 2077: Trigger the second reliability maintenance thread on the node N of the central processing unit, so that the second reliability maintenance thread detects, according to a certain frequency, the source data block registered with the second reliability maintenance thread.

The second reliability maintenance thread registered with the node N of the central processing unit is triggered to detect the source data block registered with the second reliability maintenance thread, the second reliability maintenance thread finds the source data block according to the start address in the reliability maintenance data structure in the second linked list to perform detection, and the process is the same as the detecting process of the first reliability maintenance thread on the node M of the central processing unit, which is not described here again.

Step 2078: Repair the source data block having the error; if the repairing is successful, change the source data block having the error to duplicate data, and deregister the corresponding reliability maintenance data structure of it from the first reliability maintenance thread of the central processing unit; and if the repairing is not successful, delete the source data block having the error from the memory, and reestablish a new duplicate data block according to the duplicate data block corresponding to the source data block having the error.

The repairing method is as follows: if the error occurs in one spot of the source data block, the content of the spot in the corresponding duplicate data block thereof is duplicated to the source data block having the error.

If the repairing is successful, the page table of the memory is modified, and the memory address of the source data block having the error is replaced with the memory address of the duplicate data block corresponding to the source data block having the error, that is, the source data block having the error is changed to duplicate data. And the reliability maintenance data structure corresponding to the source data block having the error is deregistered from the first reliability maintenance thread on the node M of the central processing unit.

If the data repairing is not successful due to some reasons, such as a problem occurring in the hardware, the source data block having the error is deleted from the memory, and duplication is performed according to the duplicate data block replacing the source data block having the error to reestablish a duplicate data block which is stored in the memory address of the duplicate data block replacing the source data block having the error. At this time, the replaced source data block and the reestablished duplicate data block are located in different physical memory blocks. And the error being not repaired successfully is notified to the system and is recorded as a log, so that the user may search the cause of the error according to the log, and maintain the software and hardware in time to keep the system in the best state.

Step 2079: Continue to detect the next source data block.

It should be noted that, the source data blocks are classified into several types based on the extent of the hot spot, each type of source data block has a reliability maintenance thread for detecting the data reliability according to a specific detecting frequency, so that an association is established between the detecting frequency and the extent of the hot spot of the source data block.

In the embodiment of the present invention, the corresponding duplicate data block and the corresponding reliability maintenance data structure are established for the source data block, a few threads at the central processing unit are used, and the reliability check value of the source data block is compared with the reliability check value recorded by the source data block in the reliability maintenance data structure corresponding to the source data block, so as to determine whether an error occurs, and the duplicate data is used for replacement after the error occurs, thereby implementing fast detection on the data reliability and the objective of recovering erroneous data, and reducing the system overhead.

Embodiment 3

Figure 3:
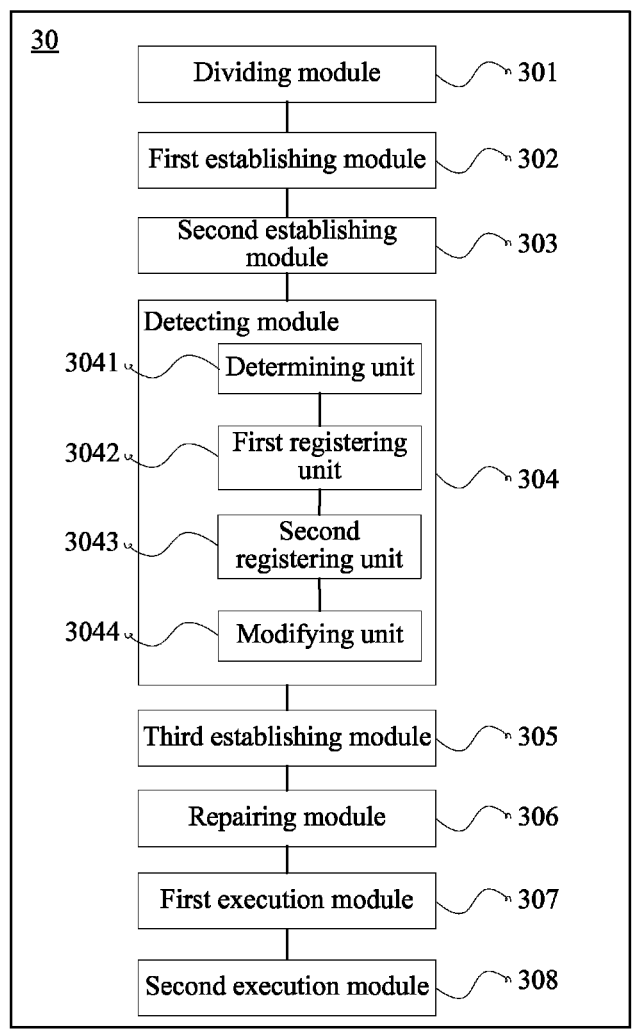
FIG. 3 is a schematic structural diagram of a device for detecting data reliability provided in Embodiment 3 of the present invention.

Embodiment 3 of the present invention provides a device 30 for detecting data reliability, and a structural diagram of it is shown in FIG. 3, which includes: a dividing module 301 configured to divide source data into multiple source data blocks; a first establishing module 302 configured to establish a corresponding duplicate data block for each source data block, where the duplicate data block and the source data block are stored in different physical memory blocks respectively; a second establishing module 303 configured to, according to each source data block, establish a corresponding reliability maintenance data structure for the source data block; and a detecting module 304 configured to register the reliability maintenance data structure with a first reliability maintenance thread of a central processing unit so that the first reliability maintenance thread detects the source data block corresponding to the reliability maintenance data structure registered with the first reliability maintenance thread to obtain a reliability check value of the source data block, compare the reliability check value with a reliability check value recorded by the source data block in the reliability maintenance data structure corresponding to the source data block, where if different, it indicates that an error occurs in the source data block, and replace the source data block having the error with the duplicate data block corresponding to the source data block having the error.

The detecting module includes: a determining unit 3041 configured to determine whether the first reliability maintenance thread exists in the central processing unit; a first registering unit 3042 configured to, if it exists, add the reliability maintenance data structure corresponding to the source data block in a linked list, and register the linked list with the first reliability maintenance thread of the central processing unit; a second registering unit 3043 configured to, if it does not exist, establish a first reliability maintenance thread at the central processing unit, add the reliability maintenance data structure corresponding to the source data block in the linked list, and register the linked list with the first reliability maintenance thread of the central processing unit; and a modifying unit 3044 configured to modify a memory page table, replace a memory address of the source data block having the error with the memory address of the duplicate data block corresponding to the source data block having the error.

The device for detecting data reliability further includes: a third establishing module 305 configured to establish a reliability maintenance data structure for the corresponding duplicate data block replacing the source data block having the error, and register the reliability maintenance data structure of the duplicate data block with a second reliability maintenance thread of the central processing unit; a repairing module 306 configured to repair the source data block having the error; a first execution module 307 configured to, if the repairing is successful, change the source data block having the error to duplicate data, and deregister the corresponding reliability maintenance data structure of it from the first reliability maintenance thread of the central processing unit; and a second execution module 308 configured to, if the repairing is not successful, delete the source data block having the error from a memory, and reestablish a new duplicate data block according to the duplicate data block corresponding to the source data block having the error.

In the embodiment of the present invention, the corresponding duplicate data block and the corresponding reliability maintenance data structure are established for the source data block, a few threads at the central processing unit are used, and the reliability check value of the source data block is compared with the reliability check value recorded by the source data block in the reliability maintenance data structure corresponding to the source data block, so as to determine whether an error occurs, and the duplicate data is used for replacement after the error occurs, thereby implementing fast detection on the data reliability and the objective of recovering erroneous data, and reducing the system overhead.

In the embodiments of the present invention, the idea of the method and the principle of the device of Embodiment 3 is the same as the idea of the method and the principle of Embodiment 1 and Embodiment 2, and therefore, the parts of Embodiment 3 which are the same as Embodiment 1 and Embodiment 2 are not described here again Persons skilled in the art should understand that all or a part of the steps of the method according to the embodiments may be implemented by a program instructing relevant hardware. The program may be stored in a computer readable storage medium. The storage medium may be, for example, a read-only memory, a magnetic disk, or an optical disk.

The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for detecting data reliability comprising:
   dividing source data into multiple source data blocks according to an integral multiple of a page frame;
   establishing a corresponding duplicate data block for each source data block, wherein the duplicate data block and the source data block are required to be stored in different physical memory blocks;
   establishing a corresponding reliability maintenance data structure for each source data block; and
   registering a reliability maintenance data structure with a first reliability maintenance thread of a central processing unit such that the first reliability maintenance thread detects the source data block corresponding to the reliability maintenance data structure registered with the first reliability maintenance thread to obtain a reliability check value of the source data block;
   comparing the reliability check value with a reliability check value recorded by the source data block in the reliability maintenance data structure corresponding to the source data block;
   identifying that an error occurs in the source data block when the comparison indicates that the reliability check value and the reliability check value recorded by the source data block in the reliability maintenance data structure are different; and
   replacing the source data block having the error with a duplicate data block corresponding to the source data block having the error.

2. The method according to claim 1, wherein registering the reliability maintenance data structure with the first reliability maintenance thread of a central processing unit comprises:
   determining whether the first reliability maintenance thread exists in the central processing unit;
   adding the reliability maintenance data structure corresponding to the source data block in a linked list and registering the linked list with the first reliability maintenance thread of the central processing unit when it is determined that the first reliability maintenance thread exists in the central processing unit; and
   establishing a first reliability maintenance thread on the central processing unit, adding the reliability maintenance data structure corresponding to the source data block in a linked list, and registering the linked list with the first reliability maintenance thread of the central processing unit when it is determined that the first reliability maintenance thread does not exist in the central processing unit.

3. The method according to claim 1, wherein replacing the source data block with the duplicate data block corresponding to the source data block having the error comprises:
   modifying a memory page table; and
   replacing a memory address of the source data block having the error with a memory address of the duplicate data block corresponding to the source data block having the error.

4. The method according to claim 1, wherein after replacing the source data block having the error with the duplicate data block corresponding to the source data block having the error, the method further comprises:
   establishing a reliability maintenance data structure for the corresponding duplicate data block replacing the source data block having the error; and
   registering the reliability maintenance data structure of the duplicate data block with a second reliability maintenance thread of the central processing unit.

5. The method according to claim 1, wherein after replacing the source data block having the error with the duplicate data block corresponding to the source data block having the error, the method further comprises:
   repairing the source data block having the error;
   changing the source data block having the error to duplicate data and deregistering the corresponding reliability maintenance data structure thereof from the first reliability maintenance thread of the central processing unit when the repairing is successful; and
   deleting the source data block having the error from a memory and reestablishing a new duplicate data block according to the duplicate data block corresponding to the source data block having the error when the repairing is not successful.

6. A device for detecting data reliability comprising:
   a dividing module configured to divide source data into multiple source data blocks according to an integral multiple of a page frame;
   a first establishing module configured to establish a corresponding duplicate data block for each source data block, wherein the duplicate data block and the source data block are required to be stored in different physical memory blocks;
   a second establishing module configured to establish a corresponding reliability maintenance data structure for each source data block; and
   a detecting module configured to:
     register a reliability maintenance data structure to a first reliability maintenance thread of a central processing unit such that the first reliability maintenance thread detects the source data block corresponding to the reliability maintenance data structure registered with the first reliability maintenance thread to obtain a reliability check value of the source data block;
     compare the reliability check value with a reliability check value recorded by the source data block in the reliability maintenance data structure corresponding to the source data block; and
     identify that an error occurs in the source data block and replace the source data block having the error with a duplicate data block corresponding to the source data block having the error when the comparison indicates that reliability check value and the reliability check value recorded by the source data block in the reliability maintenance data structure are different.

7. The device according to claim 6, wherein the detecting module comprises:
- a determining unit configured to determine whether the first reliability maintenance thread exists in the central processing unit;
- a first registering unit configured to add the reliability maintenance data structure corresponding to the source data block in a linked list and register the linked list with the first reliability maintenance thread of the central processing unit when it is determined that the first reliability maintenance thread exists in the central processing unit; and
- a second registering unit configured to establish a first reliability maintenance thread on the central processing unit, add the reliability maintenance data structure corresponding to the source data block in a linked list, and register the linked list with the first reliability maintenance thread of the central processing unit when it is determined that the first reliability maintenance thread does not exist in the central processing unit.

8. The device according to claim 6, wherein the detecting module further comprises a modifying unit configured to modify a memory page table and replace a memory address of the source data block having the error with a memory address of the duplicate data block corresponding to the source data block having the error.

9. The device according to claim 6, further comprising a third establishing module configured to establish a reliability maintenance data structure for the corresponding duplicate data block replacing the source data block having the error and register the reliability maintenance data structure of the duplicate data block with a second reliability maintenance thread of the central processing unit.

10. The device according to claim 6, further comprising:
- a repairing module configured to repair the source data block having the error;
- a first execution module configured to change the source data block having the error to duplicate data and deregister the corresponding reliability maintenance data structure thereof from the first reliability maintenance thread of the central processing unit when the repairing is successful; and
- a second execution module configured to delete the source data block having the error from a memory and reestablish a new duplicate data block according to the duplicate data block corresponding to the source data block having the error when the repairing is not successful.

* * * * *